(12) United States Patent
Hubenig

(10) Patent No.: US 11,120,103 B2
(45) Date of Patent: Sep. 14, 2021

(54) PREDICTING BINARY OUTCOMES OF AN ACTIVITY

(71) Applicant: salesforce.com, inc., San Francisco, CA (US)

(72) Inventor: Paul Walter Hubenig, San Francisco, CA (US)

(73) Assignee: salesforce.com, inc., San Francisco, CA (US)

(\*) Notice: Subject to any disclaimer, the term of this patent is extended or adjusted under 35 U.S.C. 154(b) by 545 days.

(21) Appl. No.: 15/853,714

(22) Filed: Dec. 23, 2017

(65) Prior Publication Data
US 2019/0197086 A1 Jun. 27, 2019

(51) Int. Cl.
| G06F 17/18 | (2006.01) |
| G06F 17/15 | (2006.01) |
| G06N 5/00 | (2006.01) |
| G06K 9/00 | (2006.01) |
| G06F 40/44 | (2020.01) |
| G06F 40/177 | (2020.01) |

(52) U.S. Cl.
CPC .............. *G06F 17/18* (2013.01); *G06F 17/15* (2013.01); *G06F 40/177* (2020.01); *G06F 40/44* (2020.01); *G06K 9/00* (2013.01); *G06N 5/00* (2013.01)

(58) Field of Classification Search
CPC ........ G06F 17/18; G06F 40/177; G06F 40/44; G06F 17/15; G06K 9/00; G06N 5/00
See application file for complete search history.

(56) References Cited

U.S. PATENT DOCUMENTS

| 7,512,558 | B1* | 3/2009 | Elad ................... G06Q 30/0206 705/37 |
| 9,235,846 | B2* | 1/2016 | Petschulat ........... G06F 16/2282 |
| 10,049,337 | B2* | 8/2018 | Mack ................... G06Q 10/067 |
| 2007/0061320 | A1* | 3/2007 | Surendran ............. G06F 16/345 |
| 2010/0057509 | A1* | 3/2010 | Kumar .................. G06Q 10/10 703/2 |
| 2012/0197608 | A1* | 8/2012 | Pinto ..................... G06Q 10/04 703/2 |
| 2015/0278703 | A1* | 10/2015 | Liu ........................ G06N 20/00 706/12 |

(Continued)

OTHER PUBLICATIONS

Bennasar, Mohamed, Yulia Hicks, and Rossitza Setchi. "Feature selection using joint mutual information maximisation." Expert Systems with Applications 42, No. 22 (2015): 8520-8532. (Year: 2015).*

(Continued)

*Primary Examiner* — Chuen-Meei Gan
(74) *Attorney, Agent, or Firm* — Fenwick & West LLP

(57) ABSTRACT

A binary outcome of an activity is predicted based on samples of the activity. The activity is characterized by features that can take on any of a set of mutually exclusive levels. An initial candidate pool of terms is selected. The terms are feature levels or combinations of feature levels. The candidate terms are used to create two ordered pools of terms, one including terms that are positively predictive and another including terms that are negatively predictive. The terms in each pool are ordered by strength of predictiveness and diversity of predictiveness relative to terms higher in the order. A final set of terms is selected by combining terms from these two pools.

21 Claims, 5 Drawing Sheets

(56) References Cited

U.S. PATENT DOCUMENTS

2016/0063389 A1* 3/2016 Fuchs ................... G06F 16/211
 706/12
2016/0224895 A1* 8/2016 Goel ........................ G06N 5/04

OTHER PUBLICATIONS

Bennasar, M. et al., "Feature Selection Using Joint Mutual Information Maximization," Expert Systems with Application 42 (2015) pp. 8520-8532.

* cited by examiner

PREDICTING BINARY OUTCOMES OF AN ACTIVITY

BACKGROUND

1. Technical Field

This disclosure relates generally to database and computer systems for predicting binary outcomes of an activity.

2. Description of Related Art

Database systems may store samples of an activity that has been repeated for multiple instances. For example, each sample may be stored as a row in a database. Each cell in the row represents a different feature of the activity or outcome of the activity. For example, the day of the week when the activity occurred might be one feature, with possible values of Mon, Tue, . . . Sun. The weather at the time of the activity might be another feature, with possible values of rainy, cloudy, partly cloudy, and sunny. Success or failure may be the possible outcomes for the activity. Outcomes with two possible values will be referred to as binary outcomes.

If a large number of samples have been collected, it can be useful to analyze the samples to determine which features have predictive value. However, there can be a large number of samples and a large number of features. It can be difficult to process this data in an efficient manner to build a predictive model.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Figure 1:
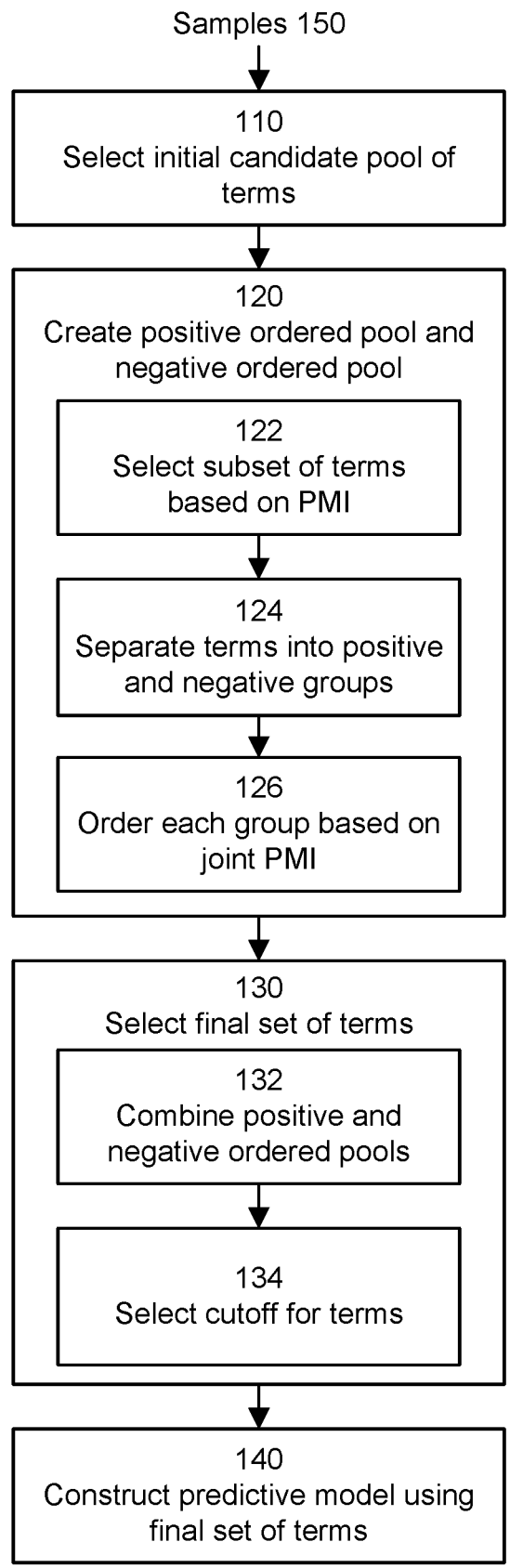
FIG. 1 is a flow diagram of a method for predicting binary outcomes of an activity, according to various embodiments.

FIG. 1 is a flow diagram of a method for predicting binary outcomes of an activity based on samples of the activity, according to various embodiments. The outer steps ending in 0 show a more general method, while the inner steps 122-126, 132-134 show specific embodiments that will be explained in conjunction with FIG. 2.

Figure 2:
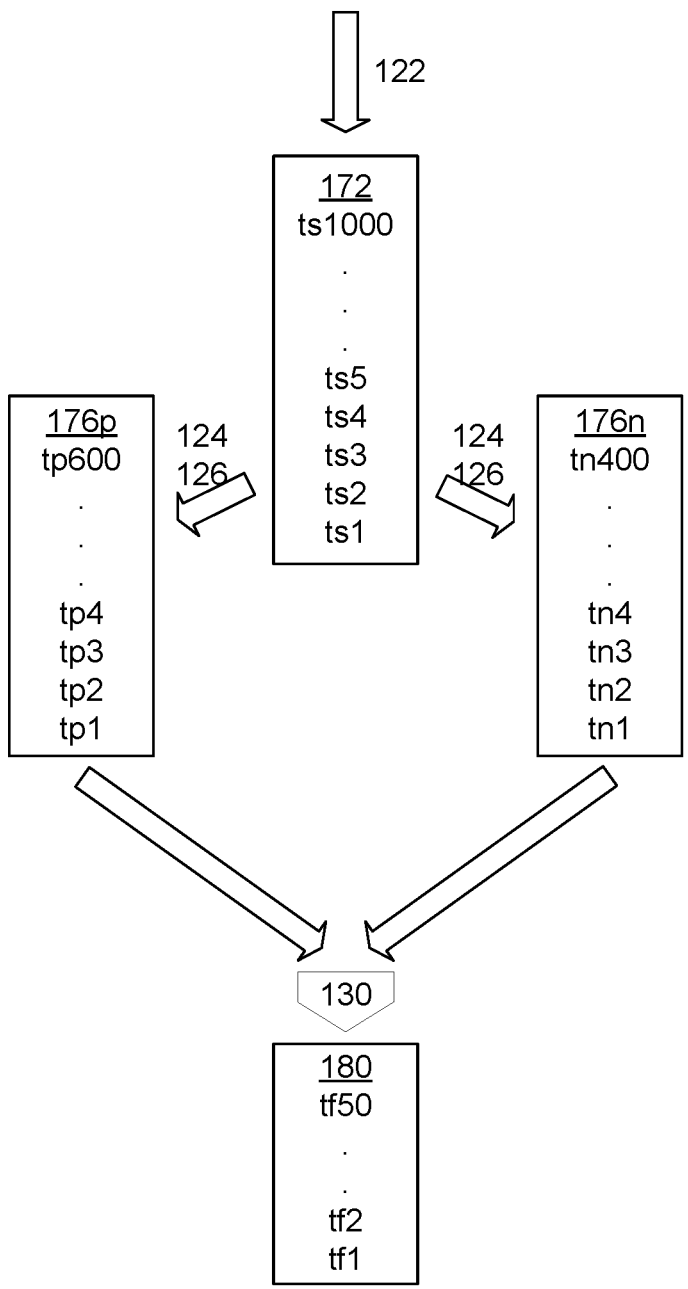
FIG. 2 is a diagram illustrating the selection of terms, according to an embodiment.

Beginning with the more general method and ignoring steps 122-126, 132-134 and FIG. 2 for the moment, an activity has a binary outcome. That is, the activity has two possible outcomes, for example "sale" or "no sale" for a sales activity. The activity is characterized by features, and each feature can take on any of a set of mutually exclusive levels. These possible levels will be referred to as the feature levels. For example, for a sales activity, one feature might be the day of the activity with possible features levels of {Mon, Tue, Wed, Thur, Fri, Sat, Sun}. Alternately, the set of features levels for the day may be chosen as {weekday, Sat, Sun}. Another feature might be whether there is a discount, with possible feature levels of {no discount, user-specific discount, store-specific discount, national discount}. Continuous variables may be binned, so the possible feature levels for the feature selling price might be {<$20, $20-$40, $40-$60, >$60}.

Referring to FIG. 1, there are many samples 150 of the activity. Each sample includes the feature levels and the binary outcome for that instance of the activity. An example sample might be (day=Wed, discount=no discount, price=$20-$40, . . . , outcome=sale). Based on this sample set, the method of FIG. 1 builds a model to predict the binary outcome of the activity. Generally, this is achieved by determining which feature levels or combinations of feature levels are predictive of the outcome.

Feature levels and combinations of feature levels from different features will be referred to as terms. Examples of single-level terms are [day=Wed], [discount=national discount], [price=$20-$40], etc. Examples of multi-level terms, also referred to as interaction terms, are [day=Wed; discount=national discount], [discount=national discount; price=$20-$40], etc. In the interaction terms, the different feature levels are AND'ed together. That is, the interaction term [day=Wed; discount=national discount] means day=Wed AND discount=national discount.

An initial candidate pool of terms is selected 110. This starting pool can be determined in many ways, subject to constraints on compute resources. In one approach, the initial pool contains all terms up to N features at a time. With N=2, the initial candidate pool would include all features levels (one-level terms) and all combinations of feature levels from two different features (two-level terms). There can be a very large number of possible terms represented in the sample set, so models typically cannot be constructed using all of the terms in the sample set and, even if they could, those models typically will not perform well for a variety of reasons.

Better and more computationally efficient models can be constructed by using a limited set of the more predictive terms. In FIG. 1, a positive ordered pool of terms and a negative ordered pool of terms is created 120 from the initial candidate pool of terms, based on the samples 150. The predictiveness of a term can be described by strength and polarity. Some terms are strongly predictive of the outcome and others are not. The polarity indicates whether the term is an indicator of the outcome (positively predictive) or a contra-indicator (negatively predictive). The two pools narrow the initial candidate pool of terms by selecting those terms that are strongly predictive and separating them into the two pools by polarity. The positive ordered pool contains the positively predictive terms and the negative ordered pool contains the negatively predictive terms.

Furthermore, within each pool, the terms are ordered, preferably according to strength of predictiveness and diversity of predictiveness relative to terms higher in the order. Terms that are strong predictors of the outcome are higher in the order. However, strength of predictiveness alone is not sufficient because a term may be a strong predictor but in a very similar way as another term that is higher in the order. In this case, the new term largely duplicates the information already provided by the term higher in the order. Therefore, the ordering of the pool also accounts for diversity of predictiveness—roughly, how much new information is added by a term compared to the information already provided by terms higher in the order.

The final set of terms is selected 130 from the terms in the positive and negative ordered pools, and the predictive model is constructed 140 from the final set of terms.

Now consider the specific embodiment shown by steps 122-126, 132-134 and FIG. 2. FIG. 2 shows a table containing N samples 190 of the activity. Each row is a different sample. The columns x1 . . . xJ are the different features, and y is the binary outcome which in this example takes on the value 0 or 1. Each cell in the table is the feature level for that particular feature and that particular sample. The sample set preferably contains at least 10-15 samples for each term in the model, with roughly equal numbers of the two binary outcomes.

One example of an activity is sales transactions. The samples are data collected on sales efforts. Features can include different characteristics about the customer, the industry, the product, the salesperson, etc. The two possible outcomes are "sale" and "no sale." In another example, the activity is loan risk. The two possible outcomes are "loan repaid" and "loan defaulted." Features could include characteristics about the borrower (age, gender, net worth, zip code, rents or owns, marital status, education level, tax bracket, etc.) Another example activity is mushroom toxicity. The two possible outcomes are "poisonous" and "not poisonous." Features includes color, shape, size, etc. In the following example, the activity is sales transactions.

Note that a sales pipeline can be characterized as a sequence of activities with binary outcomes. Identified leads are contacted (outcome: contacted or not contacted). Contacted leads are qualified (outcome: qualified or not qualified). Qualified leads express interest (outcome: interested or not interested). Interested leads attend a demonstration (outcome: demo or no demo). Those leads then decide to buy (outcome: sale or no sale).

Also note that non-binary outcomes can be deconstructed into a set of binary outcomes. For example, if the result desired is the amount of time until a lead purchases an aggregate of $1 million worth of product, this might be deconstructed into binary outcomes of (<3 mos and >3 mos), (<6 mos and >6 mos), (<12 mos and >12 mos). These binary outcomes can be used to construct ranges of 0-3 mos, 3-6 mos, 6-12 mos and >12 mos.

Returning to FIG. 2, assume the activity is characterized by 100 features (J=100), each with 10 possible feature levels, then there are 100*10=1,000 one-level terms. Now consider two-level terms. There are (100 choose 2)=4,950 distinct combinations of two features and each of those has 10*10=100 different combinations of feature levels, for a total of up to 495,000 two-level terms. That is a total of 1,000+495,000=approximately 500,000 possible candidate terms, considering only the one- and two-level terms.

Depending on the number of samples, not all of these terms may be present or they may not be present in sufficient quantities to be reliable. Assume for this example, that 400,000 of the one- and two-level terms are represented in sufficient numbers in the sample set. This is selected 110 as the initial candidate pool of terms {ti1, ti2, . . . , ti400000} where "t" stands for "term" and "i" stands for "initial."

In this example, the model used to predict the outcome y is the logistic model, although the approaches described here can be used with other models: a survival model (e.g., attempting to predict lifespan in a biological sense or otherwise for example how long someone stays unemployed or how long a software bug takes to fix), a Gompertz model, a Richards model, a Poisson model, etc. In some cases, if the nonlinear phenomenon in question is non-monotonic, the analysis may be split into monotonic regions.

In the logistic model, y is predicted according to $$\text{estimate of } y = 1/\{1+\exp\,[b0+b1tf1+b2tf2+\ldots]\} \quad (1)$$

where y takes on the values 0 and 1, the tfk (where k is an index) are the final terms used in the model, and the bk are weights. The estimate of y is bounded between 0 and 1. To produce a binary prediction, the estimate is compared to a threshold, for example 0.5. The method shown in FIG. 1 is a method for selecting the final terms {tf} from the initial candidate pool of terms {ti}. Once the final terms {tf} are selected, conventional approaches can be used to determine the corresponding weights.

Referring to FIGS. 1 and 2, a subset 172 of the initial candidate pool of 400,000 terms is selected 122 based on the partial mutual information (PMI) for each initial term ti with the outcome y. In FIG. 2, the 1000 initial terms ti with the strongest PMI are selected 122 for this subset {ts}, where "s" stands for subset, selected or second pool. This 1000-term subset is divided 124 into positively predictive and negatively predicted groups, and the terms within each group are ordered 126 according to strength and diversity of predictiveness using the joint PMI. The result is a positive ordered pool 176p of terms {tp} and a negative ordered pool 176n of terms {176n}. Here "p" and "n" stand for positive and negative, respectively. In this example, the positive ordered pool 176p contains 600 terms and the negative ordered pool 176n contains 400 terms.

Taking each of steps 122-126 in turn, the partial mutual information (PMI) is calculated 122 for each of the 400,000 terms {ti} in the initial candidate pool. Let j be the index for terms in the candidate pool, j=1 to 400,000 in this example. The PMI for term j with the outcome y is given by:

$$\text{PMI}(j) = \text{sum\_}m\{pr(mj)\log\,[pr(mj)/pr(m)pr(j)]\} \quad (2)$$

where m is the index for the two possible outcomes of y, pr(mj)=probability of outcome ym and term tij, pr(m)=probability of ym, pr(j)=probability of tij. These probabilities can be estimated from the sample set of the activity. Note that the "i" in "ti" is not an index but denotes "initial". Thus, ti1 is term 1 in the initial candidate pool, and so on.

For example, if the term of interest tij is [day=Wed] then $$\text{PMI(Wed)} = pr(\text{Wed AND no sale})\,\log\,[pr(\text{Wed AND no sale})/pr(\text{Wed})pr(\text{no sale})] + pr(\text{Wed AND sale})\,\log\,[pr(\text{Wed AND sale})/pr(\text{Wed})pr(\text{sale})] \quad (3)$$

PMI is a measure of the predictive strength of a term. Note that the terms are based on feature levels, not features. Thus, PMI(Wed) is a measure of whether [day=Wed] is a good predictor of the outcome, not a measure of whether the feature day is a good predictor of the outcome. Note also that, while PMI is a measure of the predictive strength, it does not account for the polarity of the predictiveness. A term with strong PMI may be either positively predictive or negatively predictive. PMI is always positive and does not distinguish between the two.

Step 122 continues by ordering the terms based on PMI and then selecting the terms with the highest PMI. The selected subset 172 of terms {ts} are those that are most predictive. The selection can be done in different ways, for example based on a threshold, a percentile cutoff, a number cutoff, a best fit curve, etc.

Figure 3:
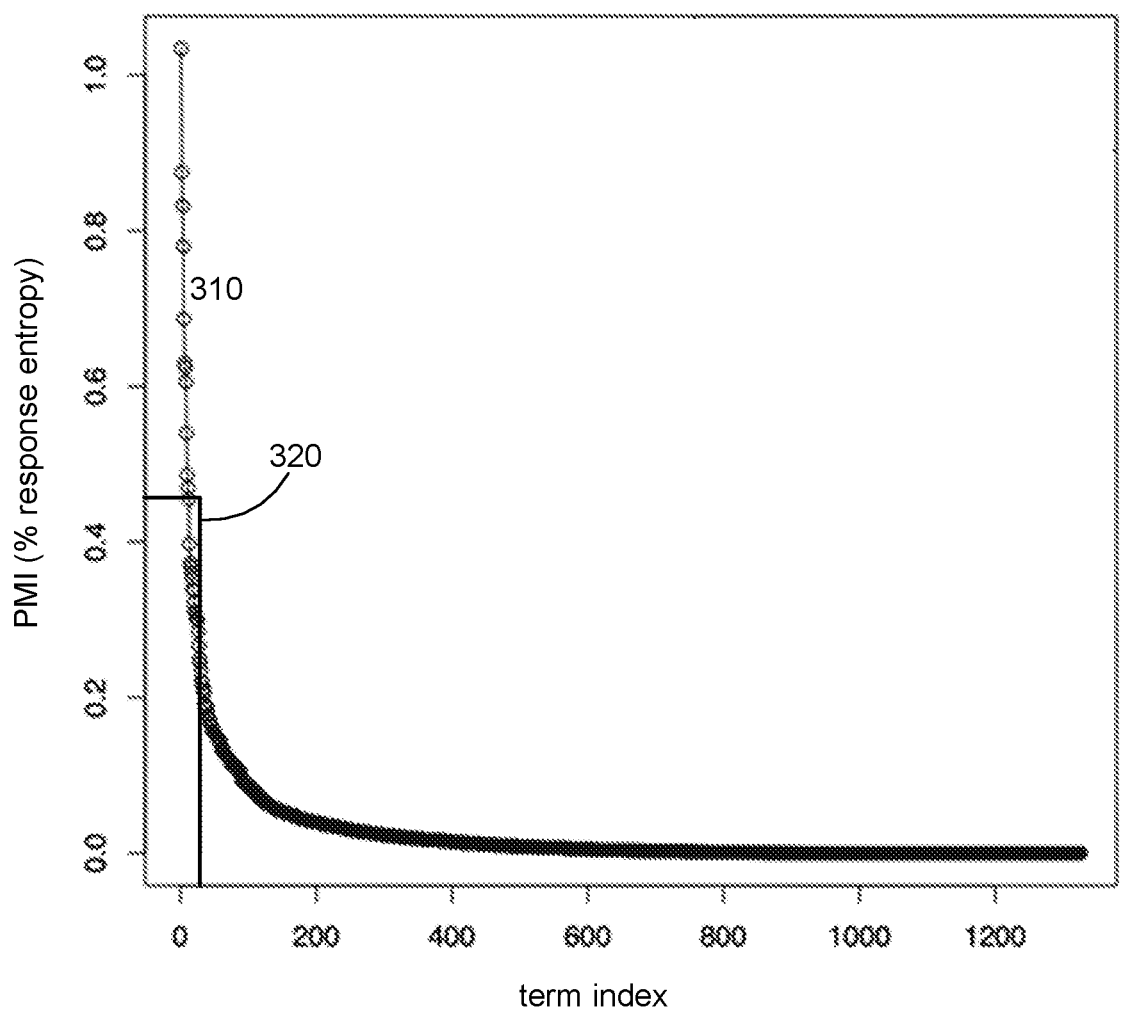
FIG. 3 is a graph of decreasing partial mutual information fit to a box curve, according to an embodiment.

FIG. 3 shows one approach. Here, the terms {ti} in the initial candidate pool are graphed in order of decreasing PMI. Term ti1 has the highest PMI, term ti2 has the second highest PMI and so forth. Curve 310 is the result. The PMI as a percentage of the response entropy captures what fraction of the total information is explained/shared by the term in a stand-alone sense without participating with other terms in a model. This curve 310 is fit to a piece-wise constant function 320. In this example, the function 320 has one level with PMI=some value for index=1 to some cutoff, and PMI=0 elsewhere. A least-squares fit is made to determine the "some value" and the "some cutoff." The terms before the cutoff index form the subset 172 of terms {ts}. In a variation, the single "box" in FIG. 3 can be extended again to the remaining curve to extract a group of next most relevant terms, and so on. Other approaches can be used to fit a piece-wise constant function.

Returning to the example of FIG. 2, the 400,000 terms of the initial candidate pool {ti} are reduced to 1000 terms {ts} in the subset 172. Often, over 90% of the terms can be discarded. This substantially reduces the candidate pool of terms. Real datasets typically have curves which drop off sharply when the PMI is sorted in descending order and graphed.

The terms {ts} in pool 172 are ordered by decreasing PMI. ts1 has the highest PMI, ts2 the second highest and so on. However, the model is not constructed by starting with term ts1 and working down in the pool 172 (which is shown as up in FIG. 2), because positively and negatively predictive terms may work against each other. In addition, terms may not be diverse with respect to each other. For example, if the top three terms ts1-ts3 are all strongly predictive but in the "same way", then adding terms ts2-ts3 to the model will not significantly advance the model beyond just term ts1. It may be preferable to add term ts4 instead if it is more diverse even though it has slightly lower PMI than terms ts2-ts3.

Accordingly, the subset {ts} is divided 124 into two groups: one which is positively predictive and one that is negatively predictive. In one approach, this is done by computing the bit-wise correlation, for example by computing the phi coefficient, also known as the mean square contingency coefficient. The sign determines whether the term is positively or negatively predictive. Assume 600 of the 1000 terms {ts} fall into the positively predictive group and 400 fall into the negatively predictive group.

Each of these groups is ordered 126 taking into account both strength of predictiveness and diversity. One approach is based on a variation of the conventional Joint Mutual Information Maximization (JMIM) algorithm, as described in "Feature Selection using Joint Mutual Information Maximization" by Bennesar et. al in *Expert Systems with Applications*, Volume 42, Issue 22, December 2015, pages 8520-8532, which is incorporated by reference herein. Roughly speaking, JMIM attempts to maximize or reward information overlap between the selected terms and the binary outcome variable, while minimizing or penalizing information overlap with the other terms. This increases predictiveness and model efficiency because diversity enables the greatest information overlap of the outcome variable and feature levels with the fewest number of terms. That is, it minimizes term redundancy. In a parsimonious model, each term contributes unique information to the predictive effort.

The conventional JMIM algorithm produces an ordered set of features based on the joint mutual information calculated for different pairs of features. In this variation, the joint PMI (rather than the joint mutual information) is calculated for pairs of terms (rather than for pairs of features). The PMI for a single term j is given by Eqn. 2 above. The joint PMI for terms j and k is the PMI for [term j OR term k].

For example, the joint PMI for terms [day=Wed] and [price=<$20] is $$\text{joint PMI(Wed OR } <\$20) = pr((\text{Wed OR } <\$20) \text{ AND no sale}) \log [pr((\text{Wed OR } <\$20) \text{ AND no sale})/pr(\text{Wed OR } <\$20)pr(\text{no sale})] + pr((\text{Wed OR } <\$20) \text{ AND sale}) \log [pr((\text{Wed OR } <\$20) \text{ AND sale})/pr((\text{Wed OR } <\$20))pr(\text{sale})] \quad (4)$$

These joint PMIs are calculated for the terms in the positively predictive group, and then the JMIM algorithm is applied using these joint PMIs to order 126 the terms. The result is the positive ordered pool 176p. The same process 126 is applied to the negatively predictive terms to produce the negative ordered pool 176n. Note that, because diversity is taken into account, the terms in either ordered pool 176p,176n typically will have a different order than in the originating pool 172.

Figure 4:
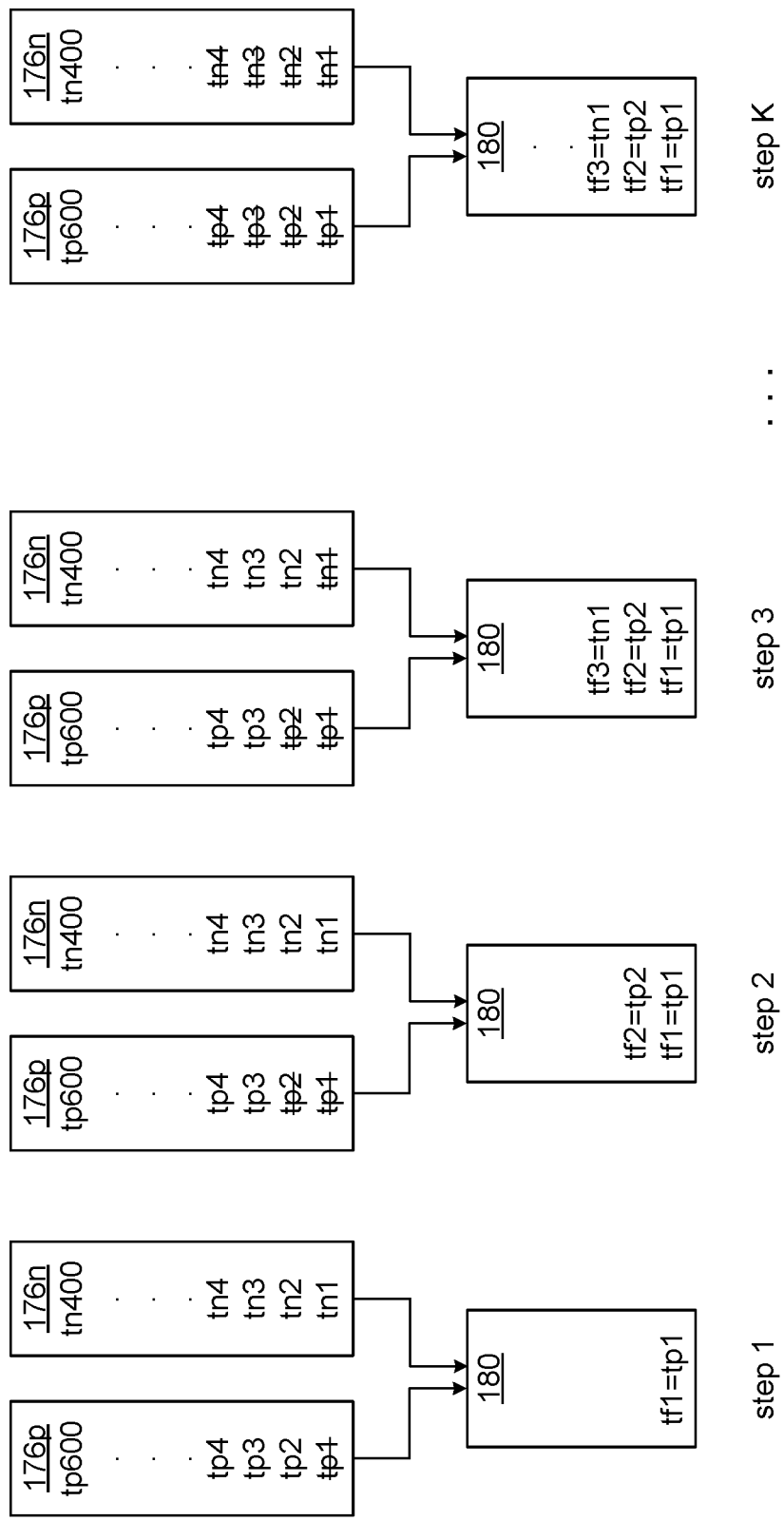
FIG. 4 is a diagram illustrating combining of positive and negative ordered pools, according to an embodiment.

The positive and negative ordered pools 176p,176n are combined 132 into a single ordered pool. An example of this process is shown in FIG. 4. Both pools 176p,176n are ordered, with term tp1 being the first term in pool 176p and term tn1 being the first term in pool 176n. In step 1, one of these two terms tp1 and tn1 is selected to start the final set 180. This could be done by selecting the term with the highest PMI, for example.

In FIG. 4, term tp1 is selected. At step 1, this is indicated by tf1=tp1 and tp1 is crossed off from pool 176p. At step 2, the next highest unselected terms are tp2 and tn1. A greedy algorithm based on some measure of model performance (e.g., log-likelihood, possibly Mathews correlation etc.) is used to select between these two.

Here, term tp2 is selected and added to the final set 180 as tf2=tp2. In step 3, the next highest unselected terms are tp3 and tn1, and tn1 is added to the final set 180 as tf3=tn1. This process continues. More terms are successively added to the final set 180 by selecting between the next highest unselected terms from the two ordered pools 176p,176n.

If all of the terms from the two ordered pools 176p,176n were included in the final set 180, then the final set 180 would contain the same 1000 terms {tf} as in the original subset 172 of terms {ts}. Typically, however, the number of terms is also cut off 134 at some number of terms. The terms cutoff can be determined by cross-validation, log-likelihood ratio (Neyman-Pearson) test, Akaike Information Criterion (AIC), etc. For example, terms are added to the final set 180 until the AIC reaches some minimum.

Figure 5B:
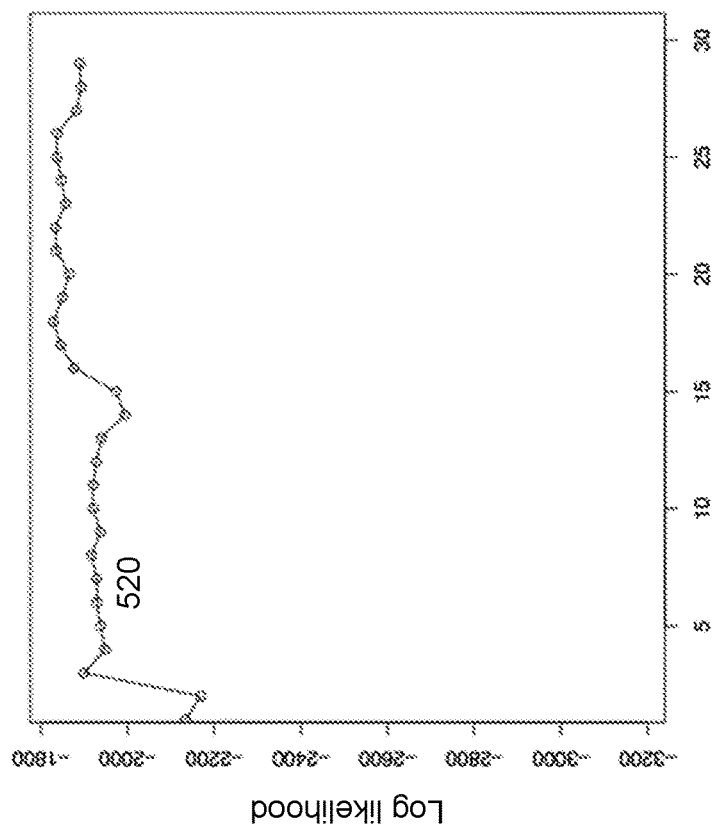
FIGS. 5A and 5B are graphs of log likelihood as a function of the number of terms used in a predictive model, according to an embodiment.
Figure 5A:
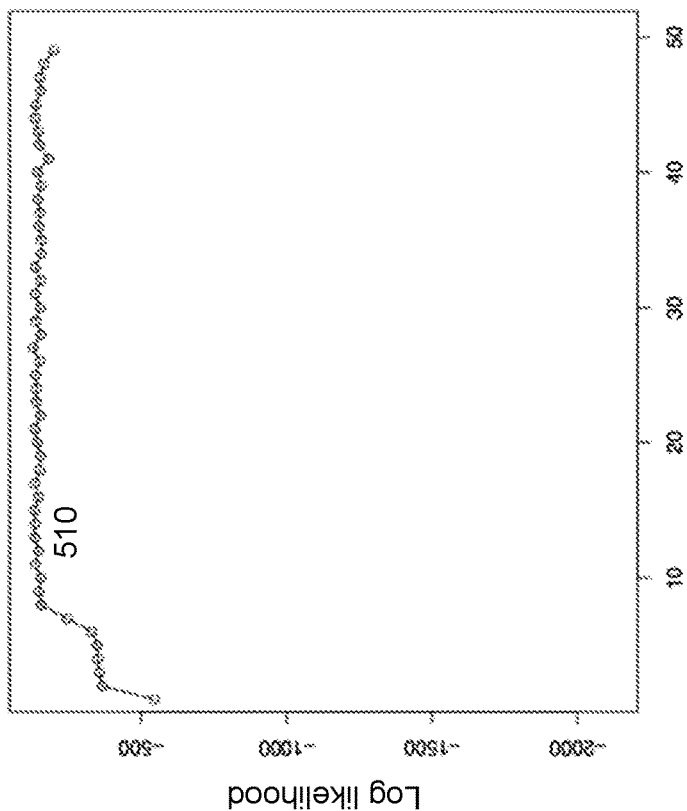

FIG. 5A is a graph of log-likelihood as a function of the number of terms in the final set. In this example, the performance curve 510 improves up to approximately 8 terms and then appears to be fairly constant after that. FIG. 5B is another example. In this case, the performance curve 520 is not monotonically increasing. The performance is fairly steady from 4 terms to about 13 terms. Then it dips. Then it improves again and is fairly steady beginning around 18 terms. These two examples are meant to show merely that at some number of terms the performance is no longer improving significantly.

Once the final set of terms 180 is selected, a predictive model is constructed 140. In this example, the model is based on the logistic model of Eqn. 1. This model can then be used to predict the outcome of future instances of the activity. Alternately, it may be used to improve the chances of the desired outcome. For example, if [day=Wed; discount=national discount] is a strong predictor of

[outcome=sale], then an organization may decide to run more national promotions on Wednesdays.

The processes described above can be implemented on different types of computer systems, including multi-tenant computer systems. In a multi-tenant computer system, multiple tenants share the use of a computer system, but without access or knowledge to each other's data or activities. Each tenant may be an enterprise. As an example, one tenant might be a company that employs a sales force where each salesperson uses a client device to manage their sales process. Thus, a user might maintain contact data, leads data, customer follow-up data, performance data, goals and progress data, etc., all applicable to that user's personal sales process.

In one embodiment, a multi-tenant computer system implements a web-based customer relationship management (CRM) system. For example, the system includes application servers configured to implement and execute CRM software applications as well as provide related data, code, forms, webpages and other information to and from client devices and to store to, and retrieve from, a database system related data, objects, and webpage content. The capabilities described above are part of the CRM software applications. The activity being analyzed may be past, current and future sales transactions.

With a multi-tenant system, data for multiple tenants may be stored in the same physical database. However, tenant data typically is arranged so that data of one tenant is kept logically separate from that of other tenants so that one tenant does not have access to another tenant's data, unless such data is expressly shared. A tenant metadata store stores information that allows identification of data for different tenants, for example, using identifiers that uniquely identify each tenant.

In certain embodiments, the system implements applications other than, or in addition to, a CRM application. For example, the system may provide tenant access to multiple hosted (standard and custom) applications, including a CRM application. According to one embodiment, the system is configured to provide webpages, forms, applications, data and media content to client devices to support the access by client devices as tenants of system. As such, the system provides security mechanisms to keep each tenant's data separate unless the data is shared.

A multi-tenant system may implement security protocols that keep data, applications, and application use separate for different tenants. In addition to user-specific data and tenant-specific data, the system may maintain system level data usable by multiple tenants or other data. Such system level data may include industry reports, news, postings, and the like that are sharable among tenants.

The processes described above may also be implemented on other types of systems, for example client-server systems, mobile technology and devices, mobile networks, wearable devices, tablets, PCs, software-as-a-service, etc.

Alternate embodiments are implemented in computer hardware, firmware, software, and/or combinations thereof. Implementations can be implemented in a computer program product tangibly embodied in a machine-readable storage device for execution by a programmable processor; and method steps can be performed by a programmable processor executing a program of instructions to perform functions by operating on input data and generating output. Embodiments can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

Although the detailed description contains many specifics, these should not be construed as limiting the scope of this disclosure but merely as illustrating different examples. It should be appreciated that the scope of the disclosure includes other embodiments not discussed in detail above. Various other modifications, changes and variations which will be apparent to those skilled in the art may be made in the arrangement, operation and details of the method and apparatus disclosed herein without departing from the spirit and scope as defined in the appended claims. Therefore, the scope of patent rights should be determined by the appended claims and their legal equivalents.

What is claimed is:

1. A computer-implemented method for predicting a binary outcome of an activity using a computationally efficient model built using samples of the activity, the method comprising:
   selecting, by a processor, an initial candidate pool of terms for the activity, wherein the initial candidate pool of terms describes instances of the activity and includes terms representing a feature level or a combination of feature levels from different features;
   calculating a partial mutual information (PMI) with binary outcome for the initial candidate pool of terms;
   selecting a subset of terms from the initial candidate pool of terms based on the PMI;
   separating the selected subset of terms into either a group of positively predictive terms or a group of negatively predictive terms based on the binary outcomes;
   calculating a joint partial mutual information (JPMI) for pairs of terms within each group respectively;
   ordering the group of positively predictive terms and the group of negatively predictive terms respectively based on strength of predictiveness and diversity of predictiveness relative to terms higher in the order;
   selecting a term that has the highest rank in either the positive or the negative ordered pool of predictive terms as a first term in a final set of terms based on the JPMI;
   successively adding more terms to the final set of terms by selecting between the next highest ranked unselected term in the positive ordered pool of predictive terms and the next highest ranked unselected term in the negative ordered pool of predictive terms until the final set of terms meet a cutoff criteria to reduce the number of terms being selected;

building the computationally efficient model based on the final set of terms, the computationally efficient model predicting the binary outcome for a given instance of the activity;

receiving new features describing a new instance of activity;

predicting the binary outcome of the new instance of activity by providing the received new features as input to the computationally efficient model; and sending the predicted binary outcome for display via a client device.

2. The computer-implemented method of claim 1 wherein selecting the subset of terms from the initial candidate pool comprises:

calculating the partial mutual information for the terms in the initial candidate pool; and selecting the subset of terms from the initial candidate pool having the highest partial mutual information, wherein the subset of terms is selected based on at least one of a threshold, a percentile cutoff, a number cutoff, or a best fit curve.

3. The computer-implemented method of claim 2 wherein selecting the subset of terms from the initial candidate pool having the highest values of partial mutual information comprises:

fitting a piece-wise constant function to a graph of decreasing partial mutual information.

4. The computer-implemented method of claim 1, wherein the initial candidate pool includes all feature levels present in the samples and all combinations of feature levels from two different features present in the samples.

5. The computer-implemented method of claim 1 wherein separating terms from the initial candidate pool into either the group of positively predictive terms or the group of negatively predictive terms is based on bit-wise correlation with the binary outcome.

6. The computer-implemented method of claim 1, wherein ordering the terms within each group is based on applying a joint mutual information maximization algorithm using the joint partial mutual information.

7. The computer-implemented method of claim 1, wherein ordering the terms within each group is based on rewarding information overlap between terms and the binary outcome while penalizing information overlap between terms.

8. The computer-implemented method of claim 1, wherein successively adding more terms to the final set of terms is based on a greedy algorithm that selects between the next highest unselected term in the positive ordered pool and the next highest unselected term in the negative ordered pool.

9. The computer-implemented method of claim 1, wherein successively adding more terms to the final set of terms stops at the cutoff based on one of cross-validation, log-likelihood ratio (Neyman-Pearson) test, and Akaike Information Criterion (AIC).

10. The computer-implemented method of claim 1, wherein the model is one of a logistic model, a survival model, a Gompertz model, a Richards model, and a Poisson model.

11. The computer-implemented method of claim 1, wherein the method is executed by a multi-tenant computer system and the method is available to multiple tenants.

12. The computer-implemented method of claim 1, wherein the activity represents an action from a sales pipeline and the binary outcome represents whether a value associated with a potential sales transaction associated with the sales pipeline.

13. The computer-implemented method of claim 1, wherein the activity is related to a potential sales transaction, and the two possible binary outcomes indicate whether a sale occurs or not.

14. A non-transitory computer-readable storage medium storing executable computer program instructions for predicting a binary outcome of an activity using a computationally efficient model built using samples of the activity, the instructions executable by a computer processor and causing the computer processor to perform steps comprising:

selecting, by a processor, an initial candidate pool of terms for the activity, wherein the initial candidate pool of terms describes instances of the activity and includes terms representing a feature level or a combination of feature levels from different features;

calculating a partial mutual information (PMI) with binary outcome for the initial candidate pool of terms;

selecting a subset of terms from the initial candidate pool of terms based on the PMI;

separating the selected subset of terms into either a group of positively predictive terms or a group of negatively predictive terms based on the binary outcomes;

calculating a joint partial mutual information (JPMI) for pairs of terms within each group respectively;

ordering the group of positively predictive terms and the group of negatively predictive terms respectively based on strength of predictiveness and diversity of predictiveness relative to terms higher in the order;

selecting a term that has the highest rank in either the positive or the negative ordered pool of predictive terms as a first term in a final set of terms based on the JPMI;

successively adding more terms to the final set of terms by selecting between the next highest ranked unselected term in the positive ordered pool of predictive terms and the next highest ranked unselected term in the negative ordered pool of predictive terms until the final set of terms meet a cutoff criteria to reduce the number of terms being selected;

building the computationally efficient model based on the final set of terms, the computationally efficient model predicting the binary outcome for a given instance of the activity;

receiving new features describing a new instance of activity;

predicting the binary outcome of the new instance of activity by providing the received new features as input to the computationally efficient model; and sending the predicted binary outcome for display via a client device.

15. The non-transitory computer-readable storage medium of claim 14, wherein successively adding more terms to the final set of terms is based on a greedy algorithm that selects between the next highest unselected term in the positive ordered pool and the next highest unselected term in the negative ordered pool.

16. The non-transitory computer-readable storage medium of claim 14, wherein the model is one of a logistic model, a survival model, a Gompertz model, a Richards model, and a Poisson model.

17. The non-transitory computer-readable storage medium of claim 14, wherein the activity is related to a potential sales transaction, and the two possible binary outcomes indicate whether a sale occurs or not.

18. A computer system comprising:
a computer processor; and
a non-transitory computer-readable storage medium storing executable computer program instructions for predicting a binary outcome of an activity using a computationally efficient model built using samples of the activity, the instructions executable by the computer processor and causing the computer processor to perform steps comprising:
selecting, by a processor, an initial candidate pool of terms for the activity, wherein the initial candidate pool of terms describes instances of the activity and includes terms representing a feature level or a combination of feature levels from different features;
calculating a partial mutual information (PMI) with binary outcome for the initial candidate pool of terms;
selecting a subset of terms from the initial candidate pool of terms based on the PMI;
separating the selected subset of terms into either a group of positively predictive terms or a group of negatively predictive terms based on the binary outcomes;
calculating a joint partial mutual information (JPMI) for pairs of terms within each group respectively;
ordering the group of positively predictive terms and the group of negatively predictive terms respectively based on strength of predictiveness and diversity of predictiveness relative to terms higher in the order;
selecting a term that has the highest rank in either the positive or the negative ordered pool of predictive terms as a first term in a final set of terms based on the JPMI;
successively adding more terms to the final set of terms by selecting between the next highest ranked unselected term in the positive ordered pool of predictive terms and the next highest ranked unselected term in the negative ordered pool of predictive terms until the final set of terms meet a cutoff criteria to reduce the number of terms being selected;
building the computationally efficient model based on the final set of terms, the computationally efficient model predicting the binary outcome for a given instance of the activity;
receiving new features describing a new instance of activity;
predicting the binary outcome of the new instance of activity by providing the received new features as input to the computationally efficient model; and
sending the predicted binary outcome for display via a client device.

19. The computer system of claim 18, wherein successively adding more terms to the final set of terms is based on a greedy algorithm that selects between the next highest unselected term in the positive ordered pool and the next highest unselected term in the negative ordered pool.

20. The computer system of claim 18, wherein the model is one of a logistic model, a survival model, a Gompertz model, a Richards model, and a Poisson model.

21. The computer system of claim 18, wherein the activity is related to a potential sales transaction, and the two possible binary outcomes indicate whether a sale occurs or not.

* * * * *